Oct. 1, 1968  J. R. MITCHELL  3,403,876

PARACHUTES

Filed Jan. 4, 1968

Inventor
JOHN ROTHWELL MITCHELL
By
Shoemaker and Mattare
Attorneys

United States Patent Office 3,403,876
Patented Oct. 1, 1968

3,403,876
PARACHUTES
John Rothwell Mitchell, Woking, England, assignor to
G. Q. Parachute Company Limited, Woking, England,
a British company
Filed Jan. 4, 1968, Ser. No. 695,724
Claims priority, application Great Britain, Jan. 26, 1967,
3,873/67
4 Claims. (Cl. 244—145)

ABSTRACT OF THE DISCLOSURE

The canopy of a parachute is divided into four bands made of materials of differing porosities, the band nearest the apex extending over about one-third of the gore length having a porosity in the region of 15 to 25 cubic feet per square foot per second, the next adjacent section extending over about one-quarter of the gore length having a porosity of between nil and ten cubic feet, the next section having a porosity of about 200 cubic feet per square foot and the hem section having a porosity similar to that of the crown section.

---

This invention relates to parachutes and particularly to the production of a canopy for a parachute which inflates quickly.

It is desirable that parachute canopies should inflate by aero-dynamic means only, without a sudden increase in the drag area, at any speed at which the parachute is likely to be deployed. With parachutes having more than one canopy it is also important that each canopy should be stable in single flight and should not be prone to wandering in relation to the other canopies in the assembly.

The object of this invention is to achieve these characteristics by using for the canopy bands of materials having differing porosities. The canopy is divided into four bands or sections. The section at the crown has a medium porosity to ensure a quick inflation of the canopy and to give a flat top to the canopy to help to ensure maximum diameter with little bouncing; the section adjoining the crown section has a low porosity to spread the canopy to its maximum diameter, the next section is of high porosity, consisting of net or tapes bridging a gap, to balance the lack of flow through the low porosity section and to ensure that the hem area unstalls rapidly during inflation, and the hem section is of medium porosity to give firm final inflation and stability.

A parachute according to the invention comprises one or more canopies and rigging lines for connecting the or each canopy to a single load, such as a parachutist, in which the or each canopy comprises a crown section, a hem section, and two intermediate sections, the crown section and hem section being made of materials having approximately the same porosity, the intermediate section nearer the crown section being made of material having no porosity or a very low porosity and the remaining section being a gap bridged by tapes or being made of net or similar material having a very high porosity.

A parachute according to the invention also comprises one or more canopies and rigging lines for connecting the or each canopy to a single load, such as a parachutist, in which the or each canopy comprises a crown section, a hem section and two intermediate sections, the crown section being made of material having a porosity of between 15 and 25 cubic feet per square foot per second, the section adjoining the crown section having a porosity of between nil and ten cubic feet per square foot per second, the hem section have a porosity of between 15 and 25 cubic feet per square foot per second and the remaining section having a porosity of about 200 cubic feet per square foot per second, all porosities being measured at a pressure of about 10 inches of water which gives a flow through an open slot of about 209 cubic feet per square foot per second.

Figure 1:
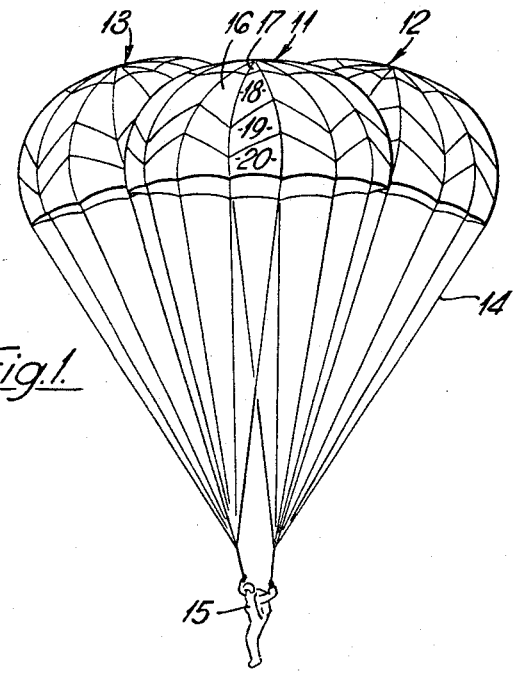
Figure 2:
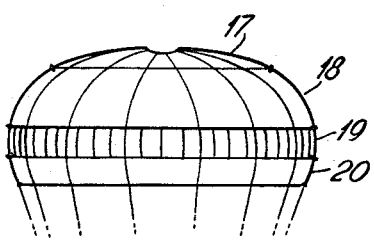
Figure 3:
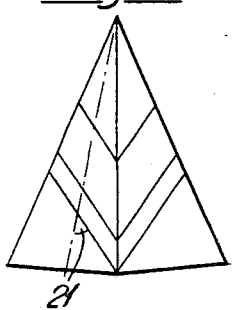
Figure 4:
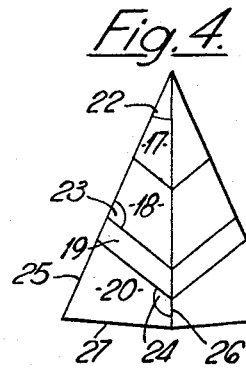

The invention is described hereinafter with reference to the accompanying drawings of which FIGURE 1 shows a parachute according to the invention, FIGURE 2 shows a block cut canopy of a parachute according to the invention, FIGURE 3 illustrates a method of making canopy gores with the material bias cut and FIGURE 4 illustrates a preferred method of the bias cut construction for a parachute according to the invention.

The parachute according to the invention shown in the drawings comprises three canopies 11, 12 and 13 which are connected by rigging lines 14 to the parachutist 15.

Each of the canopies is made from a number of gores 16 and each gore is made in four sections 17, 18, 19 and 20 having differing porosities. Section 17 extends to about one-third of the distance from the apex to the hem of the canopy and section 18 covers about three-eighths of the remaining distance, that is about one-quarter of the gore length.

The passage of air through an open slot at a pressure of 10 inches of water is about 209 cubic feet per square foot per second. We have used for the canopies of the parachute according to the invention material for the sections 17 and 20, at the crown and hem of the canopies, having a porosity of 18 cubic feet per square foot per second at 10 inches water gauge, for the section 18 adjoining the crown section 17 material having a porosity of 7 cubic feet per square foot per second at 10 inches water gauge and for the section 19 between the section 18 and the hem section 20 material having a porosity of 200 cubic feet per square foot per second at 10 inches water gauge. The material need not be of these specific porosities but we prefer to use material for sections 17 and 20 having a porosity of between 15 and 25 cubic feet per square foot, per second, for section 18 we prefer a material having a porosity of between nil and 10 cubic feet per square foot per second and for section 19 we prefer to use fine netting or a gap bridged by tapes (FIG. 2). The overall porosity of the canopy should be in the region of 15 percent, or an equivalent fabric porosity of about 40 feet per square foot per second, although porosities of 25 to 50 feet per square foot per second are suitable in certain cases. The overall porosity is controlled by varying the width of the section 19, to give with the areas of the other sections of the gores, the required porosity.

The widths of the panels are cut as economically as possible according to the width of the fabric available. A block constructed gore (FIG. 2) could be used in the canopies but this can sometimes be more difficult to manufacture and combine into main seams than a bias cut gore.

A normal bias cut gore is shown in FIGURE 3. This has an angle 21 between the central axis of the gore and the bias sections of about 45 degrees, which gives a displacement of the areas of varying porosity according to the invention which are not always suitable.

A suitable compromise is that shown in FIGURE 4. The angle 22 at the apex of each gore is about 24 degrees and the angle 23 between the gore seam 25 and the sections 18 and 19 is about 105 degrees. This gives an angle 24 between the sections and the gore seam 26 of about 129 degrees. This arrangement gives an angle of bias which is sufficient to give ease of working even with a shaped gore and allows the main seams to be slightly stretched in relation to each other during construction to allow the panels to be positioned accurately but enables the variation in porosity required over the whole gore to be obtained.

A vent opening, with or without a vent ring, can be provided at the apex of the canopy and openings can be provided in some or all canopies for navigational purposes if desired. Openings can also be provided between the various sections of the gores. The sections need not be made wholly of material having the same porosity, for example each section could contain material having varying porosities between the limits given for the materials for that section.

The material used for the canopies could be fluorescent or the material or parts of it could be treated with a chemical to give a fluorescent characteristic to the canopy. With fluorescent canopies the canopies could be recharged with light from the ground if desired, and an ultra-violet light source could be used as the recharging medium.

I claim:

1. A parachute comprising at least one canopy and rigging lines for connecting the canopy to a load, such as a parachutist, in which the canopy comprises a crown section, a hem section and two intermediate sections, the crown section being made of material having a porosity of between 15 and 25 cubic feet per square foot per second, the section adjoining the crown section having a porosity of between nil and ten cubic feet per square foot per second, the hem section having a porosity of between 15 and 25 cubic feet per square foot per second and the remaining section having a porosity of about 200 or more cubic feet per square foot per second, all porosities being measured at a pressure of about 10 inches of water which gives a flow through an open slot of about 209 cubic feet per square foot per second.

2. A parachute as claimed in claim 1 in which the said crown section extends from the apex of the canopy a distance of approximately one-third of the distance from the apex of the canopy to the peripheral hem and the adjoining section extends about three-eighths of the remaining distance towards the peripheral hem.

3. A parachute as claimed in claim 1, in which the overall porosity of the canopy is between 25 and 50 cubic feet per square foot per second.

4. A parachute as claimed in claim 1 in which the or each canopy is made of a number of gores, the material for which is bias cut at an angle of approximately 105 degrees.

References Cited

UNITED STATES PATENTS 2,358,582  9/1944  Little _____ 244—145
2,501,670  3/1950  Fogal _____ 244—145

FOREIGN PATENTS 985,301  3/1965  Great Britain.

MILTON BUCHLER, *Primary Examiner.*

R. A. DORNON, *Assistant Examiner.*